United States Patent
Omiya

(10) Patent No.: US 9,973,631 B2
(45) Date of Patent: *May 15, 2018

(54) HISTORY MANAGEMENT APPARATUS, HISTORY MANAGEMENT METHOD AND HISTORY MANAGEMENT PROGRAM

(71) Applicant: P&W Solutions Co., Ltd., Tokyo (JP)

(72) Inventor: Toshiyuki Omiya, Tokyo (JP)

(73) Assignee: P&W SOLUTIONS CO., LTD., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/272,009

(22) Filed: Sep. 21, 2016

(65) Prior Publication Data

US 2017/0013125 A1      Jan. 12, 2017

Related U.S. Application Data

(63) Continuation of application No. 14/861,774, filed on Sep. 22, 2015, now Pat. No. 9,473,633, which is a
(Continued)

(30) Foreign Application Priority Data

Aug. 17, 2012    (JP) .................................. 2012-180961

(51) Int. Cl.
*H04M 3/51*        (2006.01)
*H04M 3/42*        (2006.01)
(Continued)

(52) U.S. Cl.
CPC .... *H04M 3/5175* (2013.01); *G06F 17/30309* (2013.01); *H04M 3/2218* (2013.01);
(Continued)

(58) Field of Classification Search
None
See application file for complete search history.

(56) References Cited

U.S. PATENT DOCUMENTS 5,945,990 A    8/1999 Morrison et al.
5,946,375 A    8/1999 Pattison et al.
(Continued)

FOREIGN PATENT DOCUMENTS

JP    2007-228272       9/2007
JP    2008-092143 A    4/2008
(Continued)

OTHER PUBLICATIONS

Japan Patent Office, Notice of Reasons for Rejection issued to JP Application No. 2014-173796, dated Apr. 28, 2015.
(Continued)

*Primary Examiner* — Harry S Hong
(74) *Attorney, Agent, or Firm* — SoCal IP Law Group LLP; John E. Gunther; Steven C. Sereboff

(57) ABSTRACT

A history management apparatus that includes: a control unit and a storage unit that stores a history management program that, when executed by the control unit, causes the history management apparatus to perform actions including: acquiring a plurality of fragment data sets, an action of a contact center to a call, and an execution time of the action; generating a plurality of historical data sets indicating a history of response states to a respective plurality of calls and, for each call of the plurality of calls, determining a sequence of response states and duration of each of the sequence of response states; generating a first display image indicating the history of response states for one or more calls from the plurality of calls at the position of a corresponding time within a region indicating a designated time slot based
(Continued)

on the historical data sets; and causing the display image to be displayed on a display unit.

13 Claims, 5 Drawing Sheets

Related U.S. Application Data continuation of application No. 14/301,214, filed on Jun. 10, 2014, now Pat. No. 9,172,797, which is a continuation of application No. 13/967,173, filed on Aug. 14, 2013, now Pat. No. 9,065,907.

(51) Int. Cl.
*H04M 3/22* (2006.01)
*G06F 17/30* (2006.01)

(52) U.S. Cl.
CPC ... *H04M 3/42059* (2013.01); *H04M 3/42221* (2013.01); *H04M 2203/256* (2013.01); *H04M 2203/301* (2013.01); *H04M 2203/401* (2013.01); *H04M 2203/551* (2013.01)

(56) References Cited

U.S. PATENT DOCUMENTS

| | | | |
|---|---|---|---|
| 6,102,970 A | 8/2000 | Kneipp | |
| 6,707,904 B1 | 3/2004 | Judkins et al. | |
| 7,881,216 B2 | 2/2011 | Blair | |
| 8,031,858 B2 | 10/2011 | Miller et al. | |
| 8,824,660 B2 | 9/2014 | Omiya | |
| 9,065,907 B2 * | 6/2015 | Omiya | H04M 3/5175 |
| 9,473,633 B2 * | 10/2016 | Omiya | H04M 3/5175 |
| 2001/0040942 A1 | 11/2001 | Glowny et al. | |
| 2002/0001379 A1 | 1/2002 | Matsumoto | |
| 2002/0051530 A1 | 5/2002 | Sato et al. | |
| 2002/0176564 A1 | 11/2002 | Saito et al. | |
| 2007/0202772 A1 | 9/2007 | Sato et al. | |
| 2007/0206772 A1 | 9/2007 | Sato et al. | |
| 2008/0043988 A1 | 2/2008 | Galvin | |
| 2008/0080385 A1 | 4/2008 | Blair | |
| 2008/0080683 A1 | 4/2008 | Hasegawa | |
| 2008/0240405 A1 | 10/2008 | Conway et al. | |
| 2009/0122973 A1 | 5/2009 | Jay et al. | |
| 2010/0158237 A1 | 6/2010 | McCormack et al. | |
| 2014/0050312 A1 | 2/2014 | Omiya | |
| 2014/0050313 A1 | 2/2014 | Omiya | |
| 2014/0294163 A1 | 10/2014 | Omiya | |

FOREIGN PATENT DOCUMENTS

| | | |
|---|---|---|
| JP | 2011-151620 A | 8/2011 |
| JP | 2012-044569 | 3/2012 |

OTHER PUBLICATIONS

Japan Patent Office, Notice of Reasons for Rejection for Application No. 2012-180961, dated Aug. 19, 2014.
Japan Patent Office, Notice of Reasons for Rejection issued to JP Application No. 2012-180962, dated Feb. 9, 2016.
United States Patent & Trademark Office, Non-Final Rejection issued to U.S. Appl. No. 13/967,216, dated May 8, 2014.

\* cited by examiner

FIG. 2

| DATE | TIME | ACTION | INCOMING NUMBER | OUTGOING NUMBER | AGENT |
|---|---|---|---|---|---|
| 2012.08.01 | 10:21:11 | INCOMING | 090xxxxxxxx | | |
| 2012.08.01 | 10:21:23 | INCOMING | 080xxxxxxxx | | |
| 2012.08.01 | 10:21:35 | OP ANSWER | 090xxxxxxxx | | aaaa |
| 2012.08.01 | 10:21:36 | RESPONSE | 090xxxxxxxx | | aaaa |
| 2012.08.01 | 10:21:40 | HOLD START | 090xxxxxxxx | | aaaa |
| 2012.08.01 | 10:21:42 | OP ANSWER | 080xxxxxxxx | | bbbb |
| 2012.08.01 | 10:21:45 | RESPONSE | 080xxxxxxxx | | bbbb |
| 2012.08.01 | 10:21:51 | HOLD END | 090xxxxxxxx | | aaaa |
| 2012.08.01 | 10:21:58 | TRANSFER START | 090xxxxxxxx | 1112 | aaaa |
| ... | ... | ... | ... | ... | ... |

FIG. 3

| CALL | No | DATE | TIME | ACTION | INCOMING NUMBER | OUTGOING NUMBER | AGENT |
|---|---|---|---|---|---|---|---|
| 00001 | 01 | 2012.08.01 | 10:21:11 | INCOMING | 090xxxxxxxx | | |
| 00001 | 02 | 2012.08.01 | 10:21:35 | OP ANSWER | 090xxxxxxxx | | aaaa |
| 00001 | 03 | 2012.08.01 | 10:21:36 | RESPONSE | 090xxxxxxxx | | aaaa |
| 00001 | 04 | 2012.08.01 | 10:21:40 | HOLD START | 090xxxxxxxx | | aaaa |
| 00001 | 05 | 2012.08.01 | 10:21:51 | HOLD END | 090xxxxxxxx | | aaaa |
| 00001 | 06 | 2012.08.01 | 10:21:58 | TRANSFER START | 090xxxxxxxx | 1112 | aaaa |
| ... | ... | ... | ... | ... | ... | ... | ... |
| 00002 | 01 | 2012.08.01 | 10:21:23 | INCOMING | 080xxxxxxxx | | |
| 00002 | 02 | 2012.08.01 | 10:21:42 | OP ANSWER | 080xxxxxxxx | | bbbb |
| 00002 | 03 | 2012.08.01 | 10:21:45 | RESPONSE | 080xxxxxxxx | | bbbb |
| ... | ... | ... | ... | ... | ... | ... | ... |

FIG. 4

| QUEUE | MINUTES (START) | TIME (BEFORE) | | INCOMING NUMBER | | | | AGENT ID | | | |
|---|---|---|---|---|---|---|---|---|---|---|---|
| | WAITING TIME | INCOMING TIME | START TIME | END TIME | CALL DURATION | HOLD TIME | NUMBER OF TIMES | TRANSFER DESTINATION | POST-PROCESSING | AGENT | NOTES |
| REGISTRATION CHANGE | 00:53 | 09:50:08 | 09:51:01 | 09:56:23 | 05:22 | 00:00 | 0 | 1001 | 01:32 | H.SHIMIZU | NORMAL |
| POINT SERVICE | 00:04 | 09:51:02 | 09:51:06 | 09:53:15 | 02:09 | 00:00 | 0 | 1002 | 00:52 | K.TODA | NORMAL |
| REVOLVING | 00:08 | 10:22:08 | 10:22:16 | 10:26:41 | 02:53 | 01:32 | 1 | 1003 | 01:37 | K.NAKATA | NORMAL |
| NEW ENROLLMENT | 00:12 | 10:28:11 | 10:28:23 | 10:38:06 | 08:38 | 01:05 | 1 | 1012 | 01:41 | S.NAKAMURA | NORMAL |
| LOSS THEFT | 01:04 | 10:53:57 | 10:55:01 | 11:04:06 | 07:14 | 01:51 | 2 | 1101 | 02:22 | D.OKU | NORMAL |
| DOCUMENT REQUEST | 01:11 | 11:01:54 | 11:02:05 | 11:16:54 | 13:38 | 01:11 | 1 | 1051 | 01:11 | S.ONO | NORMAL |
| ID PASSWORD CHANGE | 01:04 | 10:56:04 | 10:56:08 | 11:00:54 | 04:46 | 00:00 | 0 | 1025 | 02:10 | Y.KAZAMA | NORMAL |
| SMALL LOAN | 01:12 | 11:21:54 | 11:22:06 | 11:28:24 | 04:47 | 01:31 | 2 | 1251 | 02:50 | S.KIKUHARA | NORMAL |
| GOLD | 00:07 | 11:26:54 | 11:27:01 | 11:39:41 | 11:49 | 00:51 | 1 | 1011 | 00:42 | H.NANAMI | NORMAL |
| | 01:03 | 11:22:59 | 11:24:02 | 11:42:06 | 16:19 | 01:45 | 2 | 1421 | 00:47 | T.FUJITA | NORMAL |
| TROUBLE INQUIRY | 00:09 | 11:40:06 | 11:40:15 | 11:51:58 | 11:43 | 00:00 | 0 | 1051 | 01:22 | D.MATSUI | NORMAL |

RECEIVE    SEARCH

HISTORY MANAGEMENT APPARATUS, HISTORY MANAGEMENT METHOD AND HISTORY MANAGEMENT PROGRAM

CROSS-REFERENCE TO RELATED APPLICATIONS

This application is a Continuation of U.S. patent application Ser. No. 14/861,774, now U.S. Pat. No. 9,473,633, filed Sep. 22, 2015, which is a Continuation of U.S. patent application Ser. No. 14/301,214, now U.S. Pat. No. 9,172,797, filed Jun. 10, 2014, which is a Continuation of U.S. patent application Ser. No. 13/967,173, now U.S. Pat. No. 9,065,907, filed Aug. 14, 2013 and claims the benefit of priority from Japanese Patent Application No. 2012-180961, filed Aug. 17, 2012. The contents of the above applications are incorporated by reference herein in their entirety.

BACKGROUND OF THE INVENTION

Field of the Invention

The present invention relates to an apparatus, method and program for history management of actions on a telephone switchboard.

Related Art

Conventionally, in a contact center, each action such as connection, hold and transfer of a line has been executed based on an incoming call from a client or an outgoing call from an agent by way of PBX (Private Branch eXchange) or CTI (Computer Telephony Integration).

In addition, it has been proposed to manage as statistical information by associating these actions with an agent who is the source of the operation (for example, refer to Japanese Unexamined Patent Application, Publication No. 2012-044569).

SUMMARY OF THE INVENTION

However, PBX or CTI records or outputs individual actions as a fragment of a response at a certain moment of the contact center. In addition, since the operational history of an agent is accumulated as statistical information also by the technology of Japanese Unexamined Patent Application, Publication No. 2012-044569, these fragments are not associated, and it has been difficult to understand the sequence of response history relative to one incoming call or outgoing call.

The present invention has an object of providing a history management apparatus, history management method and history management program that allow for the history of responses to one call to be easily understood.

The present invention provides the following such solution.

According to a first aspect, a history management apparatus, includes: an acquisition part that acquires a fragment data set indicating an action of a switchboard to a call, and an execution time of the action; a history generation part that generates a historical data set indicating a history of response states of an agent to one call, from a plurality of fragment data sets acquired by the acquisition part; an image generation part that generates data of a display image indicating the history of response states for one or more calls from the plurality of calls at the position of a corresponding time within a region indicating a designated time slot based on the historical data sets; and a display control part that causes the display image to be displayed on a display unit.

According to such a configuration, the history management apparatus can display the response history of an agent relative to one call, from a plurality of fragment data sets. Therefore, the operator of the history management apparatus can understand the transition of a series of response operations in a single call, and easily inspect and analyze whether the response was appropriate. As a result thereof, an improvement in the response quality of an agent is achieved.

According to a second aspect, in the history management apparatus as described in the first aspect, the historical data set includes a duration or number of times of each of the response states.

According to such a configuration, since the historical data includes the duration or number of times of each response state, the operator of the history management apparatus can easily understand the response time from incoming response to disconnect, hold time and number of times, transfer number of times, etc. as indices of response quality, for example, and easily inspect and analyze whether the response was appropriate. As a result thereof, an improvement in the response quality of an agent is achieved.

According to a third aspect, in the history management apparatus as described in the second aspect, for one or more calls related to a predetermined agent, respectively, the image generation part generates data of a display image in which corresponding history of the response states is arranged in a time series according to the duration of each of the response states.

According to such a configuration, the history management apparatus performs timeline display in which the corresponding history of response states is arranged in a time series according to the duration of each of these response states, for one or more calls related to an agent that is one person, respectively. Therefore, the operator of the history management apparatus can easily understand the duration and transition of response states, respectively, and easily inspect and analyze whether the responses were appropriate in the respective calls. As a result thereof, an improvement in the response quality of an agent is achieved.

According to a fourth aspect, in the history management apparatus as described in the any one of the first to third aspects, the image generation part generates data of a display image in which a link to audio recording data recording talking of the agent is associated with the response state that is corresponding.

According to such a configuration, the history management apparatus displays a link to audio recording data recording talking to be associated with the corresponding response state. Therefore, the operator of the history management apparatus can confirm the talking contents thus recorded along with the operational history of a response, and inspect and analyze whether the response was appropriate in more detail. As a result thereof, an improvement in the response quality of an agent is achieved.

According to a fifth aspect, in the history management apparatus as described in the second or third aspect, the image generation part generates data of a display image in which the historical data related to one or more calls respectively is displayed as a list.

According to such a configuration, the history management apparatus causes the historical data related to one or more calls, respectively to be displayed as a list. Therefore, the operator of the history management apparatus can easily understand the response time from incoming response to disconnect, hold time and number of times, transfer number of times, etc. as indices of response quality, for example, and easily inspect and analyze whether the response was appropriate. As a result thereof, an improvement in the response quality of an agent is achieved.

According to a sixth aspect, the history management apparatus as described in the fifth aspect further includes an extraction unit that accepts an input of a search criterion, and extracts historical data satisfying the search criterion, in which the image generation part generates data of a display image in which historical data extracted by the extraction unit is displayed as a list.

According to such a configuration, the history management apparatus extracts and displays historical data satisfying the inputted criterion. Therefore, the operator of the history management apparatus can inspect and analyze the history of response efficiently, by refining the display target among several calls responded by the contact center.

According to a seventh aspect, a history management method executed by a computer includes the steps of: acquiring a fragment data set indicating an action of a switchboard to a call, and an execution time of the action; generating a historical data set indicating a history of response states of an agent to one call, from a plurality of fragment data sets acquired in the acquiring step; generating data of a display image indicating the history of response states of the agent to the one call, based on the historical data set; and displaying the display image on a display unit.

According to such a configuration, the same effects as the first aspect can be expected by a computer executing the history management method.

According to an eighth aspect, a non-transitory computer-readable medium encoded with a history management program for enabling a computer to execute the steps of: acquiring a fragment data set indicating an action of a switchboard to a call, and an execution time of the action; generating a historical data set indicating a history of response states of an agent to one call, from a plurality of fragment data sets acquired in the acquiring step; generating data of a display image indicating the history of response states of the agent to the one call, based on the historical data set; and displaying the display image on a display unit.

According to such a configuration, the same effects as the first aspect can be expected by having a computer execute the history management program.

According to the present invention, the history of responses to one call can be understood easily.

BRIEF DESCRIPTION OF THE DRAWINGS

FIG. 2 is a view showing an example of fragment data according to the embodiment;

FIG. 3 is a view showing a portion of historical data according to the embodiment;

FIG. 4 is a view showing an example of a first screen according to the embodiment.

DETAILED DESCRIPTION OF THE INVENTION

Hereinafter, an embodiment of the present invention will be explained.

A history management apparatus 1 according to the present embodiment performs display control for allowing a manager to understand the history of response states of an agent relative to one call (incoming call or outgoing call) in a contact center.

Figure 1:
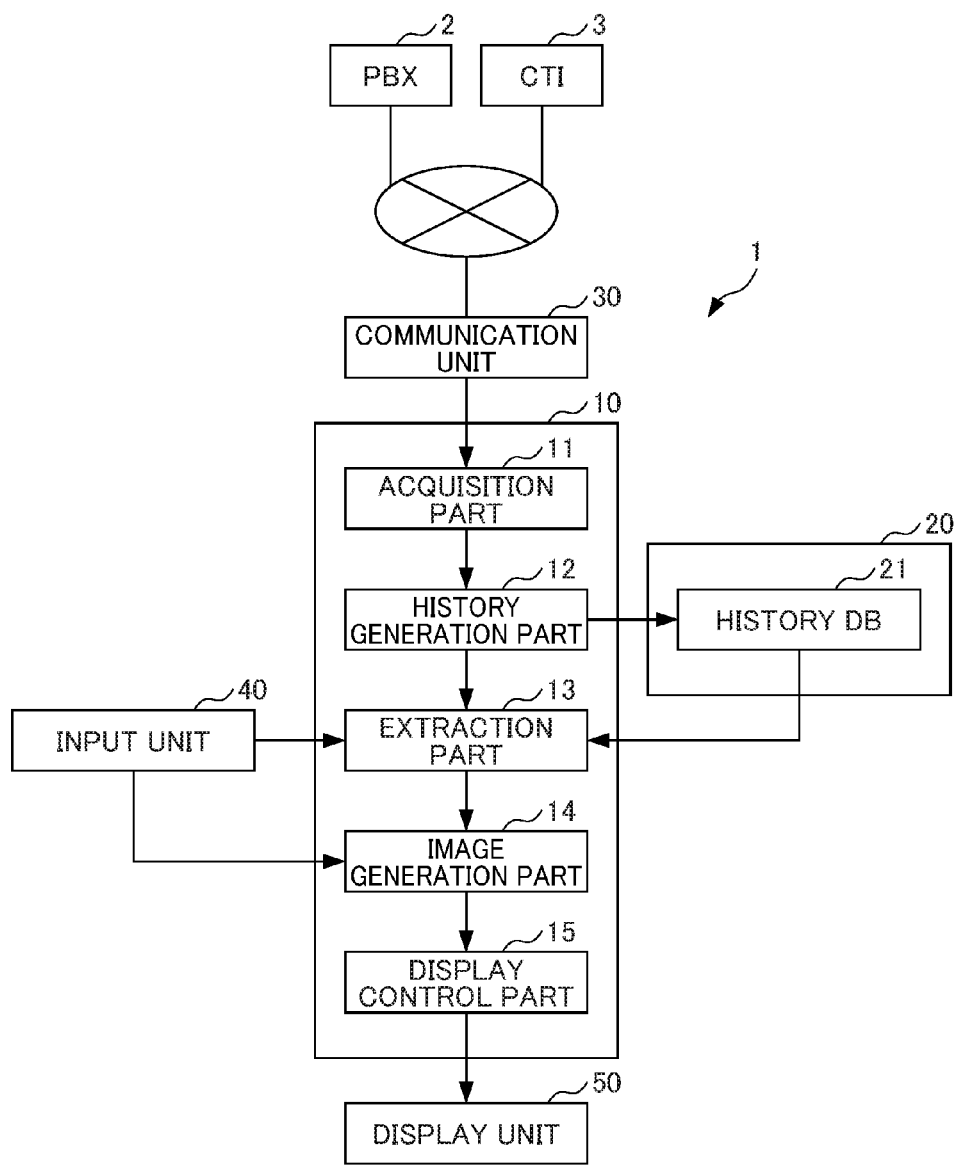
FIG. 1 is a block diagram showing a functional configuration of a history management apparatus according to an embodiment.

FIG. 1 is a block diagram showing a functional configuration of the history management apparatus 1 according to the present embodiment.

The history management apparatus 1 includes a control unit 10, storage unit 20, communication unit 30, input unit 40 and display unit 50. In addition, the history management apparatus 1 is connected with PBX 2 and CTI 3 via a predetermined network.

The control unit 10 is a portion controlling the history management apparatus 1 overall, and cooperates with the above-mentioned hardware to realize various functions of the present embodiment, by reading and executing various programs stored in the storage unit 20 as appropriate. The control unit 10 may be a CPU (Central Processing Unit). It should be noted that the functions of each part included in the control unit 10 will be described later.

The storage unit 20 is a storage area of various programs for causing hardware groups to function as the history management apparatus 1, various data, etc., and may be a HDD (Hard Disk Drive), flash memory, or the like. More specifically, a program to be executed in the control unit 10 for realizing the various functions of the present embodiment (history management program) is stored in the storage unit 20.

In addition, the storage unit 20 includes a history DB 21 that stores historical data (described later) generated by the control unit 10.

The communication unit 30 is a network adaptor for a case of the history management apparatus 1 sending and receiving data with another apparatus. The communication unit 30 performs data communication with PBX 2 or CTI 3 via the network.

The input unit 40 is an interface accepting the command inputs from an operator, i.e. manager of a contact center, to the history management apparatus 1. The input unit 40 is configured from a keyboard, mouse, touch panel, or the like, for example.

The display unit 50 is a display device that displays to the operator a screen for accepting the input of data, and displays a screen of processing results by the history management apparatus 1, according to the control of the control unit 10. The display unit 50 may be a display device such as a CRT (Cathode-Ray Tube) display device, LCD (Liquid Crystal Display) device, or the like.

Next, functions of the control unit 10 will be described in detail.

The control unit 10 includes an acquisition part 11, history generation part 12, extraction part 13, image generation part 14 and display control part 15. These respective parts are functional blocks realized by the control unit 10 executing the history management program.

The acquisition part 11 acquires, via the communication unit 30 from PBX 2 or CTI 3, fragment data indicating an action of PBX 2 to a call and the execution time of this action.

The fragment data acquired is data indicating the action performed by PBX 2 or CTI 3 at a certain moment, and a mutual association between a plurality of fragment data sets is not made. More specifically, in the case of there being a plurality of incoming consecutively to one line of the contact center, for example, the fragment data acquired in time series from PBX 2 or CTI 3 is not grouped in a unit of incoming, and the data relating to the plurality of incoming is mixed.

FIG. 2 is a view showing an example of fragment data according to the present embodiment.

In this example, the action of PBX 2, incoming number, calling number, and response handling agent are outputted relative to the data and time. In these fragment data sets acquired in time series, the fragment data related to a call received from an incoming number "090xxxxxxxx" and the fragment data related to a call received from an incoming number "080xxxxxxxx" are mixed.

The history generation part 12 generates historical data showing the history of response states of an agent relative to one call, from the plurality of fragment data sets acquired by the acquisition part 11.

Since history such as the duration and the number of times of each response state, which vary depending on actions of a series relative to one call, are not included in the fragment data sets of FIG. 2, the history generation part 12 first sorts the fragment data sets according to the incoming number.

FIG. 3 is a view showing a part of historical data generated by the history generation part 12 according to the present embodiment.

In this example, the history generation part 12 extracts a series of fragment data related to one call starting from incoming, and groups according to identification data and sequence number (No) of the call.

Furthermore, the history generation part 12 calculates the duration, number of times, etc. of each response state, which vary depending on the series of actions, respectively, based on the fragment data sets grouped, and stores as a part of the historical data along with the identification data of the call.

For example, the time from "incoming" until "operator (OP) answer" is stored as "waiting time". In addition, the total of the times from "hold start" until "hold end" is stored with the number of times as "hold time". Moreover, in the time from "response" until "disconnect" or "transfer end", the time excluding "hold time" is stored as "call duration". Additionally, the number of times of "transfer start" is stored.

Furthermore, in a case of an agent performing post-processing such as recording relating to a call after talking, this post-processing time is accumulated in CTI 3. This post-processing time is stored as a part of historical data by the history generation part 12, after acquired as fragment data by the acquisition part 11.

The extraction part 13 accepts the input of search criterion for screening from historical data stored in the history DB 21, and extracts historical data satisfying this search criterion.

FIG. 4 is a view showing an example of a first screen displayed on the display unit 50 according to the present embodiment.

In this example, a queue selection field 61 indicating a work section in the contact center, a range input field for a response start time or response end time (selection button 62 for response start or response end, time input field 63, selection button 64 for before or after, and range input field 65), incoming number selection field 66, and agent selection field 67 are provided as input means of search criteria. The extraction part 13 extracts historical data satisfying the conditions, when any of these search criteria are designated, and the search button 68 is pressed. It should be noted that a receive button 70 will be described later.

The image generation part 14 generates data of a display image showing the history of response states of an agent to one call, based on the historical data extracted by the extraction part 13.

The display control part 15 causes the display image generated by the image generation part 14 to be displayed on the display unit 50.

More specifically, the image generation part 14 generates data of an image to be displayed in a list display field 69 in the first screen example shown in FIG. 4, for example.

In this example, among the historical data related to one or more calls, respectively, the waiting time that is the time from incoming until response, the incoming time, the response start time, the response end time, the call duration, the hold time and number of times holding, transfer destination, post-processing time, and initially responding agent are list displayed.

Herein, the display contents of the list display field 69 are updated as appropriate in response a predetermined operation of the input unit 40 by the operator to the history management apparatus 1, i.e. manager of the contact center.

For example, by operating the input unit 40, the manager selects a predetermined one item among the respective items of "waiting time" to "notes" in the list display field 69, and can make a designation to sort the selected item in ascending order or descending order individually.

In this case, the image generation part 14 sorts the item selected by the manager in ascending order or descending order according to this designation, and generates data of an image in which the list display field 69 has been updated based on the results of this sorting.

In this way, for example, the manager can refine the calls (talking) having a short response time as well handled calls (talking). Then, the manager can enact training of other agents by showing the other agents the well handled calls as handling serving as a model (including talking contents).

Conversely, the manager can refine calls (talking) with long response time as poorly handled talking, for example. Then, the manager inspects the contents of the poorly handled call, and can enact training of agents including the agent who responded to this call, based on the results of this inspection.

In addition, for example, by operating the input unit 40, the manager can input a phone number (incoming number) of a client that had a complaint in the incoming number selection field 66 as a criterion, and search by pressing the search button 68.

In this case, the extraction part 13 accepts the input of this search criterion, and extracts historical data satisfying this search criterion. The image generation part 14 generates data of an image in which the list display field 69 has been updated, based on the historical data extracted by the extraction part 13.

In this way, a manager can easily specify the complaint talking and the agent who handled this complaint talking. In other words, the manager can easily make refinement of the past calls (talking) of clients having complaints, refinement of the handling agents on this occasion, etc. Since the manager can thereby easily confirm the talking contents and specify the cause bringing about the complaint, it becomes possible to enact prevention of future complaint occurrences.

In addition, for example, by operating the input unit 40, the manager can input desired times, etc. into the range input field of response start time or response end time (selection button 62 for response start or response end, time input field 63, selection button 64 of before or after, and range input field 65) as the search criterion, and search by pressing the search button 68.

In this case, the extraction part 13 accepts the input of this search criterion, and extracts historical data satisfying this search criterion. The image generation part 14 generates data of an image in which the list display field 69 has been updated, based on the historical data extracted by the extraction part 13.

In this way, the manager can easily designate a desired time slot, using the search criteria of a variation like the response start time and end time, as well as how many minutes before or how many minutes after these times. More specifically, for example, in the case of a specific call (talking) that is the search target existing, even without knowing the exact time of the start time or end time of the response of this specific call, the manager can input an approximate time as the start time or end time, and easily search for this specific call by simply inputting the search criteria like setting until around a few minutes thereof as the search range.

In addition, for example, by operating the input unit 40 and pressing the receive button 70, the manager can select a desired one as a search criterion among incoming and outgoing as well as unanswered disconnect of the contact center as display targets of the list display field 69.

In this case, the extraction part 13 accepts the input of this search criterion, and extracts historical data satisfying this search criterion. The image generation part 14 generates data of an image in which the list display field 69 has been updated, based on the historical data extracted by the extraction part 13.

Herein, when unanswered disconnect is selected, for example, the extraction part 13 can extract (refine) historical data related to unanswered disconnect for which conventional confirmation has been difficult, from the log of PBX 2 or CTI 3 (fragment data). Therefore, the manager can easily confirm the number of received cases disconnected prior to connecting to an agent, time waiting until disconnection, etc., by viewing the list display field 69 based on this historical data. Then, based on the confirmed information, the manager can enact an improvement such that the contact center becomes a center that efficiently connects from the viewpoint of the client, by reassessing the settings of IVR (Interactive Voice Response) and reassessing the number of agents.

In addition, for one or more calls related to a predetermined agent selected by the manager, respectively, the image generation part 14 generates data of a display image arranging the corresponding history of response states in a time series depending on the duration of these response states, respectively.

Furthermore, in the case of audio recording data recording the talking contents of an agent existing, the image generation part 14 generates data of a display image associating a link to this audio recording data to the corresponding response state.

Figure 5:
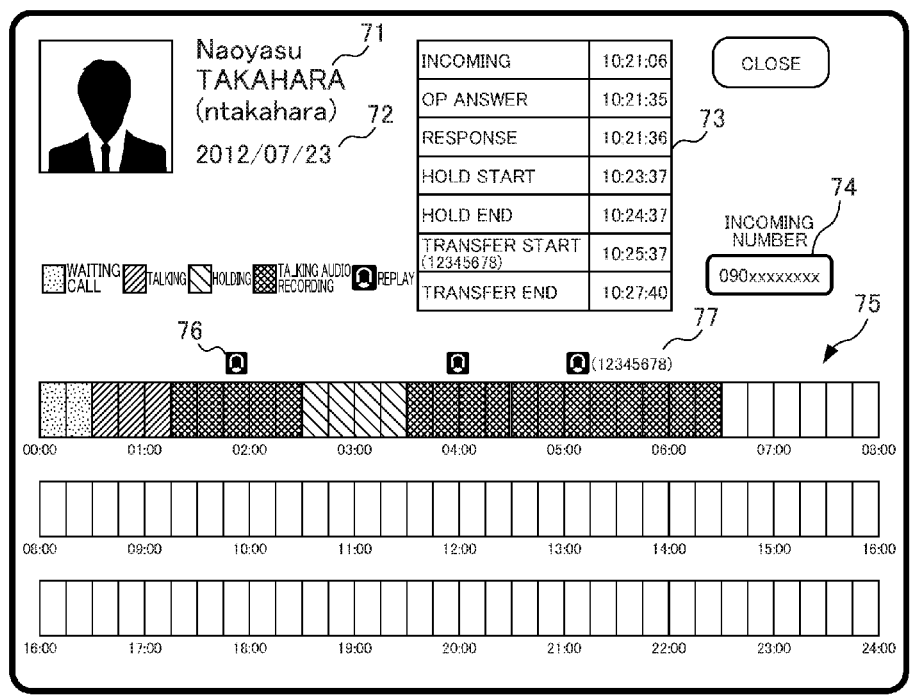
FIG. 5 is a view showing an example of a second screen according to the embodiment.

FIG. 5 is a view showing an example of a second screen displayed on the display unit 50 according to the present embodiment.

The second screen is displayed in a case of a call being selected in the list display field 69 of the first screen (FIG. 4).

In this example, a selected agent name 71, a display target date 72 of historical data, a display field 73 of a series of actions and times in the historical data related to a call handled by the selected agent, an incoming number 74 identifying the call, and a timeline display field 75 are displayed.

In the timeline display field 75, the durations of each of "waiting call", "talking" and "holding" in the historical data related to the call are color classified, and displayed by graphing on a predetermined time axis.

Furthermore, in "talking", the time slot in which the audio recording data exists is displayed color coded as "talking audio recording". For example, in the talking time from "response" 30 seconds after incoming until "hold start" after about a further 2 minutes, the second half is distinguished as "talking audio recording".

In addition, a link 76 to the audio recording data is displayed to be associated with "talking audio recording", and the audio recording data is replayed by this link 76 being pressed.

In addition, in the case of a call having been transferred, although displayed as "talking" or "talking audio recording", in this case, a transfer destination number 77 is jointly displayed.

It should be noted that, in the case of having been transferred, it may be configured in a different display form such as color coding normal "talking" and "talking audio recording".

According to the present embodiment as above, the history management apparatus 1 can display response history of an agent to one call from a plurality of fragment data sets. Therefore, the manager can understand the transition of a series of response operations in a single call, and easily inspect and analyze whether the response was appropriate. As a result thereof, an improvement in the response quality of an agent is achieved.

In addition, the historical data includes the duration or number of times of response states, respectively. Therefore, the manager can easily understand the response time from incoming response to disconnect, hold time and number of times, transfer number of times, etc. as indices of response quality, for example, and easily inspect and analyze whether the response was appropriate. As a result thereof, an improvement in the response quality of an agent is achieved.

In addition, the history management apparatus 1 causes historical data to be displayed on a timeline for one or more calls related to an agent that is one person, respectively. Therefore, the manager can easily understand the duration and transition of response states, respectively, and easily inspect and analyze whether the responses were appropriate in the respective calls. As a result thereof, an improvement in the response quality of an agent is achieved.

At this time, the history management apparatus 1 displays a link to audio recording data recording talking to be associated with the corresponding response state. Therefore, the manager can confirm the talking contents thus recorded along with the operational history of a response, and inspect and analyze whether the response was appropriate in more detail. As a result thereof, an improvement in the response quality of an agent is achieved.

In addition, the history management apparatus 1 causes the historical data related to one or more calls to be respectively displayed in a list. Therefore, the manager can easily understand the response time from incoming response to disconnect, hold time and number of times, transfer number of times, etc. as indices of response quality, for example, and easily inspect and analyze whether the response was appropriate. As a result thereof, an improvement in the response quality of an agent is achieved.

In addition, the history management apparatus 1 extracts and displays historical data satisfying the inputted search criterion. Therefore, the manager can inspect and analyze the history of response efficiently, by refining the display target among a lot of calls responded by the contact center.

In addition, as a refined search keys in the first screen (FIG. 4), the selection field 61 to agent selection field 67, and the receive button 70 are used. Therefore, a manager or the like can freely input search criteria by combining these search keys. In this case, the history management apparatus 1 can change the display contents of the list display field 69 in the first screen (FIG. 4), and transition the screen from the first screen (FIG. 4) to the second screen (FIG. 5), in response to the search criteria. In other words, for the manager, it is possible to change the display function of the history management apparatus 1, by a combination of refined search keys on the screen. More specifically, for example, the manager can change the screen display to timeline display (second screen) in which an exchange with an agent is arranged in a time series, by refining by the telephone number of a client; therefore, it is possible to easily confirm the circumstances of this exchange.

Although an embodiment of the present invention has been explained above, the present invention is not to be limited to the aforementioned embodiment. In addition, the effects described in the present embodiment are merely exemplifying the most preferred effects arising from the present invention, and the effects from the present invention are not to be limited to those described in the present embodiment.

The items included in the aforementioned historical data are an example, and the items displayed in the first screen (FIG. 4) can be changed as appropriate. For example, the transfer number of times, transfer time, etc. may be calculated and displayed.

In addition, the display mode of the historical data is not limited. For example, in the case of transfer having been made a plurality of times, a plurality of transfer destinations may be displayed, and a plurality of agents may be displayed. In addition, for example, in place of the incoming time, a time until disconnect, starting from incoming, including waiting time, OP answer, talking time+hold time, transfer and transfer destination talking time may be displayed as the response time.

The combination for refined search keys on the first screen (FIG. 4), and the function corresponding to this combination (display contents) are an example, any number of any types of search keys including the search keys illustrated can be employed, and the combination and corresponding relationship with a function (display contents) may be arbitrary in this case.

The timeline display in the second screen (FIG. 5) is an example, and the display mode can be changed as appropriate.

For example, the display scale (length of one minute on the screen) and display range are not limited to the example of FIG. 5, and may be variable. Furthermore, the display control part 15 may accept an instruction input of magnify/reduce via the input unit 40 to change the display image.

In addition, the historical data of a plurality of calls may be displayed simultaneously as a plurality of timelines. In this case, in the plurality of historical data sets displayed, a series of actions and times in a selected historical data set are displayed in the display field 73.

In addition, within a region indicating one day or a predetermined time slot, historical data related to one or a plurality of calls may be displayed at the position of a corresponding time.

The history management apparatus 1 may be carious information processing devices (computer) such as server equipment, a PC (Personal Computer) or a tablet terminal, in which each of the aforementioned functions are realized by software. In the case of being realized by software, the program constituting this software is installed in the information processing device. In addition, these programs may be distributed by recording onto removable media such as CD-ROM, or may be distributed by downloading to the information processing device via a network.

In addition, the functions of the history management device 1 may be distributed in part to CTI 3, another server, or the like. In this case, the processing load on the terminal of the manager having a display function is reduced.

What is claimed is:

1. A history management system, comprising:
   a telephone switchboard;
   a control unit;
   a display unit; and
   a storage unit that stores a history management program that, when executed by the control unit, causes the control unit to perform actions including:
      acquiring a plurality of fragment data sets from the telephone switchboard, each of which includes a call identifier, an action of the telephone switchboard to a call identified by the call identifier, and an execution time of the action;
      generating a plurality of historical data sets indicating a history of response states for individual calls from a plurality of calls connected by the telephone switchboard by sorting the plurality of fragment data sets by call identifier and, for each call of the plurality of calls, determining a sequence of response states and duration of each of the sequence of response states;
      generating a first display image including one or more timelines indicating the history of response states for one or more calls from the plurality of calls based on the historical data sets; and
      causing the first display image to be displayed on the display unit.

2. The history management system of claim 1, further comprising:
   a network interface unit coupled to the control unit,
   wherein acquiring the plurality of fragment data sets comprises receiving the plurality of fragment datt sets from the telephone switchboard via a network and the network interface unit.

3. The history management system of claim 1, wherein, the first display image indicates the history of response states for the selected call arranged in a time series according to the duration of each of the response states.

4. The history management system of claim 1, the actions performed further including:
   generating a second display image in which the historical data sets related to one or more calls are displayed as a list.

5. The history management system of claim 1, the actions performed further including:
   accepting a search criterion via an operator interface and extracting historical data satisfying the search criterion, and
   generating a third display image in which the extracted historical data is displayed as a list.

6. The history management system of claim 1, wherein, for each call transferred between two or more agents, the corresponding historical data set integrates the response states for the two or more agents.

7. The history management system of claim 1, wherein the first display image indicates one or more recorded portions of the selected call and includes respective links to replay respective recordings of each of the one or more recorded portions.

8. The history management system of claim 7, the actions performed further including:

upon selection of one of the links included in the first display image, replaying an audio recording associated with the selected link from the memory.

9. A history management method executed by a computer and a telephone switchboard, comprising the steps of:

connecting a plurality of calls;

generating a plurality of fragment data sets, each of which includes a call identifier, an action of the telephone switchboard to a call identified by the call identifier, and an execution time of the action;

generating a plurality of historical data sets indicating a history of response states for individual calls from the plurality of calls connected by the telephone switchboard by sorting the plurality of fragment data sets by call identifier and, for each call of the plurality of calls, determining a sequence of response states and duration of each of the sequence of response states;

generating a first display image including one or more timelines indicating the history of response states for one or more calls from the plurality of calls based on the historical data sets; and causing the first display image to be displayed on a display unit.

10. A non-transitory computer-readable medium encoded with a history management program for a computer coupled to a telephone switchboard, the history management program causing the computer to execute the steps of:

acquiring a plurality of fragment data sets from the telephone switchboard, each of which includes a call identifier, an action of the telephone switchboard to a call identified by the call identifier, and an execution time of the action;

generating a plurality of historical data sets indicating a history of response states for individual calls from a plurality of calls connected by the telephone switchboard by sorting the plurality of fragment data sets by call identifier and, for each call of the plurality of calls, determining a sequence of response states and duration of each of the sequence of response states;

generating a first display image including one or more timelines indicating the history of response states for one or more calls from the plurality of calls based on the historical data sets; and causing the first display image to be displayed on a display unit.

11. The history management system of claim 1, wherein a scale and range of the one or more timelines in the first display image are variable.

12. The history management system of claim 11, the actions performed further including:

accepting an instruction to magnify or reduce the scale of the one or more timelines in the first display image.

13. The history management system of claim 1, wherein the telephone switchboard is one of a private branch exchange (PBX) and a computer telephony integration (CTI) apparatus.

* * * * *